(12) United States Patent
Benson et al.

(10) Patent No.: US 7,054,162 B2
(45) Date of Patent: May 30, 2006

(54) SECURITY MODULE SYSTEM, APPARATUS AND PROCESS

(75) Inventors: Justin H. Benson, La Mirada, CA (US); John I. Daspit, Rancho Palos Verdes, CA (US); Charles McCown, Palos Verdes Estates, CA (US)

(73) Assignee: Safenet, Inc., Belcamp, MD (US)

( * ) Notice: Subject to any disclaimer, the term of this patent is extended or adjusted under 35 U.S.C. 154(b) by 919 days.

(21) Appl. No.: 09/782,448

(22) Filed: Feb. 13, 2001

(65) Prior Publication Data

US 2002/0002683 A1     Jan. 3, 2002

Related U.S. Application Data

(60) Provisional application No. 60/182,426, filed on Feb. 14, 2000.

(51) Int. Cl.
*H05K 7/02*      (2006.01)
*G06F 12/14*     (2006.01)

(52) U.S. Cl. ............... 361/760; 361/752; 713/194; 257/922; 257/678; 29/830

(58) Field of Classification Search ......... 361/752, 361/760, 748, 761, 730; 174/35 GC, 52.1; 29/830, 831, 842; 257/922; 713/194
See application file for complete search history.

(56) References Cited

U.S. PATENT DOCUMENTS

| | | | | |
|---|---|---|---|---|
| 4,593,384 A | * | 6/1986 | Kleijne | ............... 365/228 |
| 4,691,350 A | * | 9/1987 | Kleijne et al. | ........... 713/194 |
| 4,807,284 A | * | 2/1989 | Kleijne | ............... 713/194 |
| 4,811,288 A | * | 3/1989 | Kleijne et al. | ............... 365/52 |
| 5,117,457 A | | 5/1992 | Comerford et al. | |
| 5,159,629 A | * | 10/1992 | Double et al. | ............... 713/194 |
| 5,185,717 A | * | 2/1993 | Mori | ............... 365/52 |
| 5,353,350 A | * | 10/1994 | Unsworth et al. | ........... 713/194 |
| 5,389,738 A | * | 2/1995 | Piosenka et al. | ........... 174/52.4 |
| 5,406,630 A | * | 4/1995 | Piosenka et al. | ............... 380/52 |
| 5,761,054 A | * | 6/1998 | Kuhn | ............... 361/818 |
| 5,835,781 A | * | 11/1998 | Van de Steeg et al. | ......... 712/1 |
| 5,858,500 A | * | 1/1999 | MacPherson | ............... 428/68 |
| 5,998,858 A | * | 12/1999 | Little et al. | ............... 257/678 |
| 6,201,296 B1 | * | 3/2001 | Fries et al. | ............... 257/679 |
| 6,414,884 B1 | * | 7/2002 | DeFelice et al. | ............ 365/195 |
| 6,438,825 B1 | * | 8/2002 | Kuhn | ............... 29/830 |
| 6,496,119 B1 | * | 12/2002 | Otterstedt et al. | .......... 340/653 |
| 6,512,454 B1 | * | 1/2003 | Miglioli et al. | ............ 340/541 |
| 6,853,093 B1 | * | 2/2005 | Cohen et al. | ............... 257/678 |
| 2001/0033012 A1 | * | 10/2001 | Kommerling et al. | ...... 257/679 |
| 2001/0056542 A1 | * | 12/2001 | Cesana et al. | ............ 713/194 |
| 2003/0009683 A1 | * | 1/2003 | Schwenck et al. | .......... 713/194 |

* cited by examiner

*Primary Examiner*—Kamand Cuneo
*Assistant Examiner*—Dameon E. Levi
(74) *Attorney, Agent, or Firm*—Venable LLP

(57) ABSTRACT

A system, method and apparatus for protecting circuit components from unauthorized access. The circuit components to be protected are disposed on a first layer of a substrate with a plurality of layers. A cover member composed of a plurality of layers is abutted to the substrate, defining an enclosure space for enclosing the circuit components to be protected. A three-dimensional resistive network sensor surrounds the protected circuit components. The sensor comprises at least one conduction path in at least one of the layers below the first layer of the substrate and at least one conduction path in at least one of the layers of the cover member and also comprises a plurality of vias transverse to and electrically connecting the conduction paths. A short or open in the sensor will be detected by a tamper detection circuit that is disposed on the first layer of a substrate.

33 Claims, 6 Drawing Sheets

FIGURE 3A.
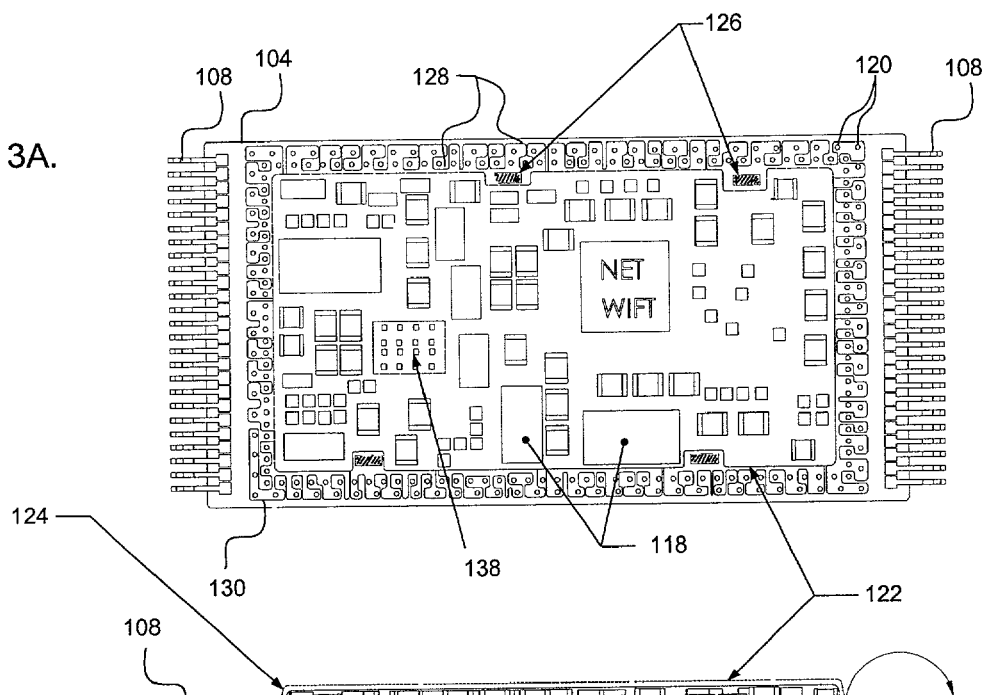
FIGURE 3B.
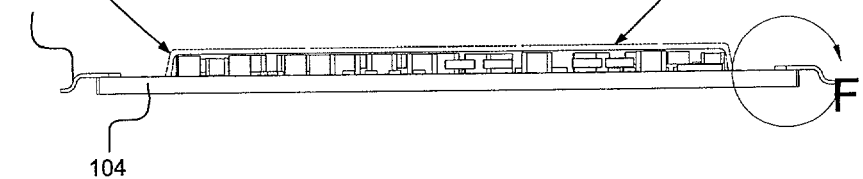
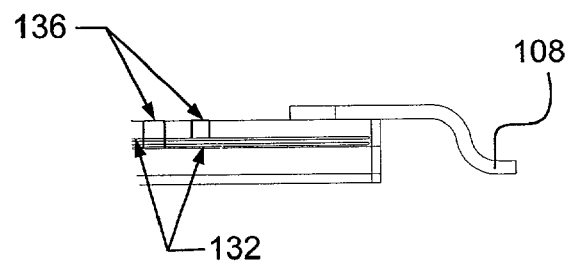
FIGURE 3C.
DETAIL F

— 134

DETAIL C

SECTION B-B

SECURITY MODULE SYSTEM, APPARATUS AND PROCESS

RELATED APPLICATION

The present invention relates to U.S. Provisional Application No. 60/182,426, filed Feb. 14, 2000, which is incorporated herein by reference and from which priority is claimed.

BACKGROUND OF THE INVENTION

1. Field of the Invention

The present invention relates, generally, to systems, apparatuses and processes for securing electronic components or data and, in preferred embodiments, to a security module that encloses electronic components and protects against unauthorized access to the electronic components.

2. Description of Related Art

The security of data stored in electronic circuitry has become an important issue. Highly sensitive information such as financial data, PIN numbers, passwords, and access codes are frequently the target of unauthorized access by hackers.

It has been the purpose of software encryption/decryption methods to avoid such unauthorized access to sensitive programs or data by providing software keys which are stored in memory devices and are used to encrypt and decrypt sensitive programs or data. While this method has proven effective against software hackers, other methods of accessing sensitive programs or data remain a challenge.

One such method is the penetration of the physical package containing electronic components such as processors, logic circuits, or other circuits or components, as well as various memory devices used to store programs or data. Exposed address and data lines within the package may allow access to sensitive data. The penetration of the physical package may be brought about through chemicals, drilling, separation, etc. In addition, X-rays and other known techniques may allow non-destructive penetration into the physical package.

Many methods directed towards securing sensitive data against such physical penetration have been described. For example, U.S. Pat. No. 4,691,350 describes a device for securing microelectronic circuitry. An outer housing comprising individual ceramic plates surrounds a printed circuit board with microelectronic circuitry thereon and additional ceramic plates which form an inner housing around the printed circuit board. Each of the ceramic plates of the outer housing has, on its inner surface, superposed layers of conductive material separated by insulating layers.

The superposed layers include a "first conductive path segment" arranged in a winding configuration, "a conductive sheet," and a "second conductive path segment" arranged in a winding configuration complementary to the winding configuration of the first conductive path. The conductive path segments on each given plate are serially connected to form a wire mesh segment associated with the plate. The conductive sheets and wire mesh segments on the plates of the outer housing are interconnected using interconnection blocks.

A voltage plane is connected between a supply voltage and a sensing circuit in the tamper detection circuit. The wire mesh is connected between a reference potential, such as ground, and a sensing circuit. According to the patent, an interruption in the wire mesh or a short of the wire mesh to the voltage plane caused by a tamper attempt may be detected by a low voltage detector in the tamper detection circuit. The tamper detection circuit also includes a low temperature detector which detects attempts at freezing CMOS memory cells.

U.S. Pat. Nos. 4,593,384; 4,807,284; and 4,811,288 describe other devices for securing microelectronic circuitry which employ similar rigid housings formed of plates having serpentine or meandering conductor paths. The devices comprise a plurality of separate plates which must be individually fabricated and subsequently assembled together using epoxy bonding.

The process of assembling these plates into a housing can be relatively complex. The various plates must be bonded together in a sequential manner and then the respective electrical connections must be formed using, for example, conductive epoxy. After the housing is assembled, non-conductive epoxy may be required along the lines between the adjacent parts to seal any gaps and provide additional strength to the housing. This process is not conducive to automated assembly procedures.

Other methods of securing sensitive data against such physical penetration have been described in other patents. For example, U.S. Pat. No. 5,353,350 describes an encapsulated polymer cradle to protect electronic circuitry from tampering. The polymer cradle comprises a transducer capable of generating a voltage in response to an alteration of pressure or temperature, and electronic means to detect the voltage and destroy sensitive data upon detection.

U.S. Pat. No. 5,998,858 describes a multi-layered interlaced conductive grid, which is integral to a microprocessor and hinders de-layering of the chip using chemical etching techniques or focused-ion beam methods.

U.S. Pat. No. 5,389,738 describes electrode finger grids which are provided above and below an integrated circuit die to detect physical attempts to penetrate the integrated circuit die.

U.S. Pat. No. 5,159,629 describes a screen material with fine conductive lines formed thereon in close proximity to each other. This screen material surrounds the electronic assembly to be protected. Changes in the resistance of the conductive lines will generate a signal which will cause the erasure of a memory containing secured data.

U.S. Pat. No. 5,117,457 describes a tamper-resistant package for protecting information stored in electronic circuitry. The package comprises an energy source which applies energy to an energy distribution system which surrounds the electronic circuitry. The energy distribution system comprises a path or paths for energy distribution. Sensing means are provided for sensing an intrusion into the energy distribution system.

While the methods for protecting electronic circuitry from unauthorized access which are discussed above may hinder hackers in their attempt to access sensitive data, they also have many limitations. Some involve complex components and assembly procedures which are not conducive to mass production. Others provide only partial protection by leaving unobstructed areas of the package vulnerable to physical attack.

In addition, without a method of easily varying the configuration of the protective devices, repeated studied attacks on a particular protective device may reveal ways to bypass the protections provided. U.S. Pat. No. 5,117,457, discussed above, describes methods of varying the path or paths for energy. However, the methods taught are complex.

Accordingly, there is a demand in the industry for a package for securing electronic components or data that provides a relatively high level of security and also has a design and configuration conducive to economical production processes such as automated mass production.

SUMMARY OF THE DISCLOSURE

Therefore, it is an advantage of embodiments of the present invention to provide systems, apparatuses and processes for securing electronic components or data which provide a relatively high level of security by utilizing various combinations of security features which make it very difficult to access the electronic components or data.

It is a further advantage of embodiments of the present invention to provide a security module design and configuration conducive to economical production processes such as automated mass production.

It is a further advantage of embodiments of the present invention to provide a relatively easy process for varying the configuration of certain security features provided by a security module, thus making it more difficult to bypass the security features provided through repeated studied attacks of the security module.

These and other advantages are accomplished according to systems, apparatuses and processes for securing electronic components and data by utilizing a security module comprising various security features to enclose the electronic components and data. The electronic components to be protected may comprise processors, logic circuits, or other circuits or components used in data encryption/decryption operations, financial transactions, or other security sensitive functions, as well as various memory devices used to store programs or data. The electronic components further include a tamper detection circuit that operates with different sensors and components in the security module to detect an attempt to penetrate the security module.

Depending upon the context of use, the security module may include various combinations of security features which function together to provide a degree of security. Passive security features which may be included in various embodiments of the invention include security coatings, environmental barrier coatings, and surfaces that are opaque to non-destructive penetration by electro-magnetic inspection tools such as, but not limited to, X-rays. Active security features which may be included in various embodiments of the invention include conductive ink fuses, temperature sensors, and embedded three-dimensional resistive network sensors. Various embodiments of the invention include one or more of these security features. Preferred embodiments of the present invention contain each of these security features.

In a preferred embodiment of the present invention the security module comprises a substrate and a cover. An embedded three-dimensional resistive network sensor comprises a multiplicity of serial conductive paths which are integral to the substrate and the cover. The substrate and cover are abutted together through BGA interconnects and provide a cavity to enclose the electronic components and data. Thus, the embedded three-dimensional resistive network sensors essentially surround the electronic components or data.

A physical attempt to access the electronic components or data through penetration of the cover or the substrate may be detected by a tamper detection circuit provided on the substrate and coupled to the active security features. Key zeroing electronics may be provided to zeroize, i.e., destroy or erase, sensitive programs and data contained in electronic components upon being triggered by a tampering attempt. The embedded three-dimensional resistive network sensor may be fabricated on the substrate and the cover using standard fabrication techniques. Also, the abutting together of the cover and the substrate may be performed by automated assembly processes. Thus, the security module and its security features may be fabricated and assembled utilizing economical production processes such as automated mass production.

A programmable pad array is provided which may be selectively wirebonded during the assembly process to combine various serial paths together to form a multiplicity of continuous serial paths around the enclosure formed by the substrate and the cover. Thus, embodiments of the present invention provide a relatively easy process to vary the configuration of the embedded three-dimensional resistive network sensor which results in additional protection against successful access to the enclosed electronic components.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout:

FIG. 3A illustrates a top view of a substrate for the security module of FIG. 1;

FIG. 3B illustrates a side, cross section view of the substrate of FIG. 3A;

FIG. 3C illustrates a cutaway side view of the substrate of FIG. 3A;

DETAILED DESCRIPTION OF THE EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Figure 1:
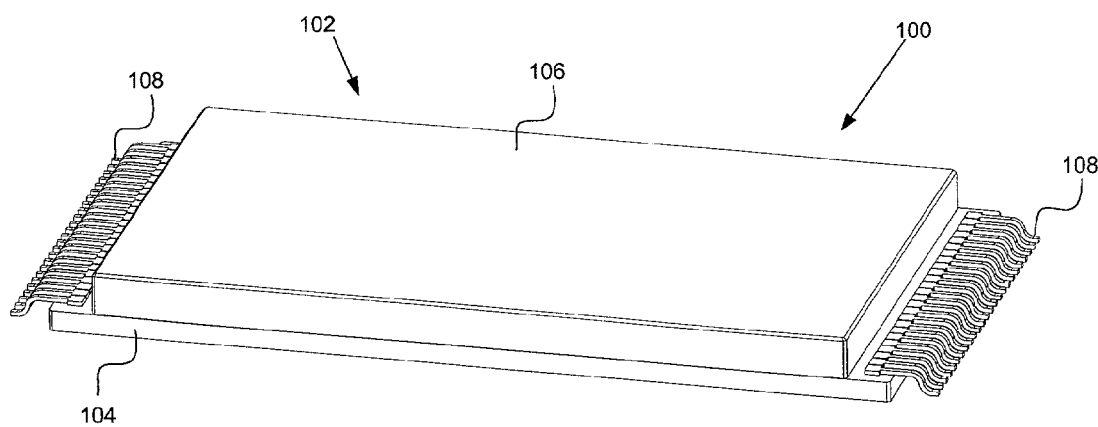
FIG. 1 illustrates a security module as a discrete component according to an embodiment of the invention.

FIG. 1 illustrates a perspective view of an embodiment of the present invention employing an example of each of the above-noted passive and active security features. Security module 100 provides protection for electronic components contained within the enclosure created by the abutting of a substrate 104 and a cover 106.

Security module 100 may be manufactured as a discrete component which may then be attached to a Peripheral Component Interface (PCI) card using, for example, surface mount technology (SMT). In the alternative, security module 100 may be manufactured as a subassembly mounted in a standard carrier technology such as a card in Personal Computer Memory Card International Association (PCMCIA) format. FIG. 1 illustrates an embodiment of security module 100 as a discrete component. Thus, leads 108 have been attached to substrate 104 during the assembly process to provide means for surface mounting.

Figure 2:
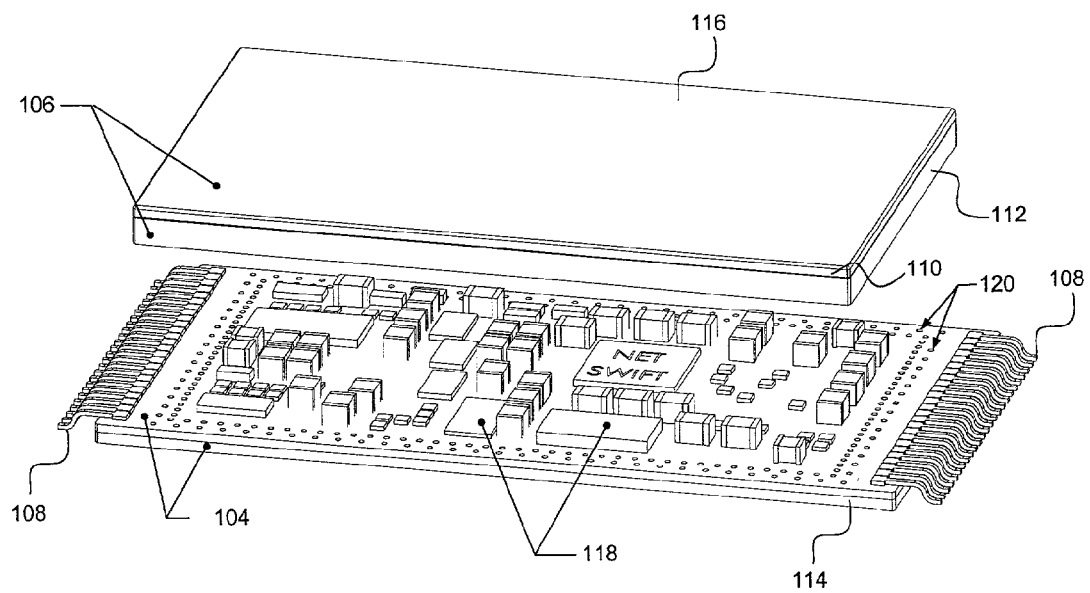
FIG. 2 illustrates a perspective view of the security module of FIG. 1 with the cover removed.

FIG. 2 is a perspective view of security module 100 with cover 106 removed. In a preferred embodiment, cover 106 is manufactured using multi-layer laminate technology. By co-lamination of planar lid structure 110 and outer seal ring 112, cover 106 is formed as a singular piece with a recessed middle portion. When joined to substrate 104, the recessed middle portion provides a cavity for housing electronic components, referred to generally by numeral 118. A backplane 116, made of an X-ray opaque material such as, but not limited to, copper, tantalum, solder tinned on patterns of copper traces which effectively obscure the patterns of conductors formed in the substrate, or the like, is co-laminated with cover 106. Backplane 116 provides a deterrent against X-rays and other electro-magnetic inspection tools, which may be used to attempt non-destructive penetration into security module 100.

In a preferred embodiment, substrate 104 is also manufactured using multi-layer laminate technology. A backplane 114, made of an X-ray opaque material such as, but not limited to, copper, tantalum, solder tinned on patterns of copper traces which effectively obscure the patterns of conductors formed in the substrate, or the like, is co-laminated with substrate 104 and provides a deterrent against X-rays and other electro-magnetic inspection tools. Electronic components 118 are attached to the surface of substrate 104. Interconnects 120 are provided on the periphery of substrate 104 to allow attachment of cover 106 to substrate 104.

FIG. 3A is a top view of substrate 104 with cover 106 removed. Secure coating 122 is shown deposited over electronic components 118 to inhibit access to electronic components 118 and their associated circuit traces and interconnects on substrate 104.

FIG. 3B is a side view of substrate 104 with cover 106 removed. Referring to FIG. 3B, it can be seen that, in addition to secure coating 122, environmental barrier coating 124 may be applied over secure coating 122 to form a conformal coverage over the area containing electronic components 118. The use of environmental barrier coating 124 may be beneficial to protect against damage from the outside environment, if the joined surfaces of substrate 104 and cover 106 do not produce a sufficient seal.

Further preferred embodiments of the present invention actively protect against tampering by providing a tamper protection circuit which monitors various components and sensors on substrate 104 in order to detect a tampering attempt. These components and sensors may include conductive ink fuses to detect chemical attacks, a temperature sensor, and an embedded three-dimensional resistive network sensor. Key zeroing electronics may be provided to zeroize, i.e., destroy, sensitive programs and data contained in memories upon being triggered by these protective devices.

A preferred embodiment of the present invention provides active protection against tampering by chemical attack. FIG. 3A shows conductive ink fuses 126, which are provided on substrate 104 to detect chemical attacks on security module 100. Conductive ink fuses 126 are not covered by secure coating 122 or environmental barrier coating 124. During the layout process for electronic components 118 on substrate 104, conductive ink fuses 126 may be provided at various locations along the periphery of substrate 104 in order to detect tampering by chemicals and trigger zeroization. Additionally or alternatively, conductive ink fuses 126 may be placed in close proximity to sensitive components on substrate 104 or at other suitable locations on substrate 104 for the same purpose.

A further preferred embodiment of the present invention provides active protection against tampering by providing a temperature sensor on substrate 104. The temperature sensor is monitored by the tamper detection circuit such that an attempt to remove cover 106 at a temperature within a defined range may be detected by the tamper detection circuit to trigger the key zeroing electronics. The temperature sensor may comprise any suitable temperature sensing electrical device, including, but not limited to, thermistors, comparable integrated circuit (IC) components, or the like.

A further preferred embodiment of the present invention provides active protection against tampering by providing a three-dimensional resistive network sensor which is incorporated in substrate 104 and cover 106 and which essentially surrounds the entire area enclosed by substrate 104 and cover 106. The three-dimensional resistive network sensor may comprise multiple layers of inter-digitated serpentine serial conductor paths which are integral to the laminates of the substrate 104 and the cover 106. Each layer preferably comprises a plurality of such serpentine serial conductor paths which may be located within the layer in a pseudo-random manner, i.e., in many different possible configurations that appear random. These serpentine serial conductor paths may be essentially in parallel with one another. Alternatively, the separate serial conductor paths may be pseudo-randomly placed about each layer. The serpentine serial conductor paths may be electrically connected to land grid arrays (LGAs) along the peripheries of the abutted surfaces of both substrate 104 and cover 106 by a staggered row or "picket fence" configuration of vertical through-holes and blind vias. These vertical through-holes and blind vias may also run along the peripheries of the abutted surfaces of the substrate 104 and the cover 106 and may be transverse and preferably essentially perpendicular to the multiple layers.

The LGAs along the peripheries of the abutted surfaces of the substrate 104 and the cover 106 may be, in turn, electrically connected along their respective surfaces by respective isolated surface serpentine conductors. The LGAs on the surface of substrate 104 may have a pattern which matches the pattern of the LGAs on the surface of cover 106. When these two surfaces are abutted, the two matching patterns are electrically connected to each other by suitable interconnecting structure. In a preferred embodiment, the interconnecting structure comprises ball grid array interconnects, which provide not only an electrical connection, but a mechanical connection with substantial rigidity, strength, and security.

Particular inter-digitated serpentine serial conductor paths in substrate 104 and cover 106 may be combined with segments of the picket fence, and thus with segments of the LGAs, to form one or more and, preferably a multiplicity of serial conductive paths that may essentially surround the electronic components within the enclosure formed by substrate 104 and cover 106. This multiplicity of serial conductive paths may be combined into various configurations by interconnecting various serial conductive paths. In a preferred embodiment of the present invention, the number of possible configurations will be large enough that any one configuration will appear to be random. Thus, a pseudo-random configuration of serial conductive paths in a security module is possible. The particular pseudo-random combination may be selected through the use of a programmable device provided on substrate 104, which will be discussed in more detail below.

An additional advantage of the inter-digitated serpentine serial conductor paths in substrate 104 and cover 106 is that a parasitic capacitance may be developed between the outermost layer of serpentine serial conductor paths in substrate 104 and cover 106 and its associated adjacent laminated metallic cover. This capacitance may be modified by an attempt to remove the laminated metallic cover. This capacitance may act as an additional sensor that may be monitored by the tamper detection circuit, thus providing an additional safeguard against tampering.

Accordingly, the three-dimensional resistive network sensor comprises a multiplicity of isolated serial conductive paths that essentially surround the enclosure formed by substrate 104 and cover 106, any number of which may be selectively programmed during the assembly process. The three-dimensional resistive network sensor may be coupled to a tamper detection circuit provided on substrate 104. A penetration of the three-dimensional resistive network sensor may break a serial conductive path. This break may be detected by the tamper detection circuit. The key zeroing electronics may, in response, destroy or erase any sensitive programs or data contained in selected memory devices on substrate 104.

An advantage of the pseudo-random configuration of serpentine serial conductor paths provided throughout the enclosure formed by substrate 104 and cover 106 is that it provides very few or no unobstructed paths for penetration of security module 100, making it very difficult to penetrate the enclosure without triggering the tamper detection circuit. In addition, a parasitic capacitance may be developed using this configuration which may be monitored by the tamper detection circuit. These layers of pseudo-random serpentine serial conductor paths may be cost-effectively integrated into the manufacturing process of the multi-layer substrate and cover using standard deposition techniques and automated processes.

Additional protection against side penetration of security module 100 may be provided by the staggered picket fence configuration of plated through-holes and blind vias which may be provided along the entire periphery of the substrate 104 and the cover 106, including around the corners. This picket fence configuration provides very little spacing between plated through-holes and blind vias to reduce any free space along the sides at which to penetrate security module 100. Also, the BGA interconnects which interconnect the two surfaces provide not only an electrical connection, but a mechanical connection with substantial rigidity, strength, and security.

Further, the isolated surface serpentine conductors located along the periphery of substrate 104 and cover 106 provide additional protection against penetration of security module 100 along the abutted surfaces of substrate 104 and cover 106, because an attempt to penetrate this area may result in a short circuit between serial paths which may be detected by the tamper detection circuit.

Figure 4:
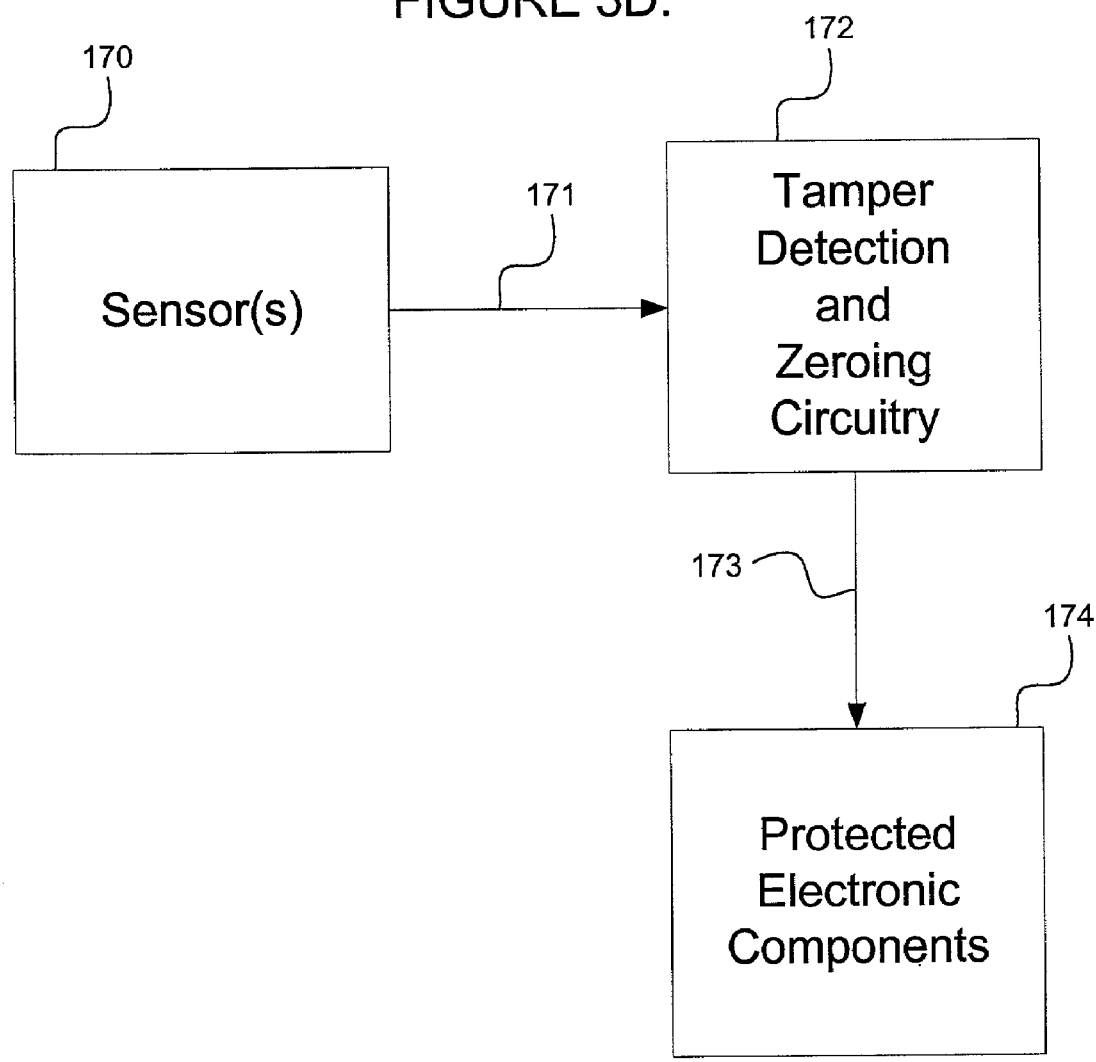
FIG. 4 illustrates a block diagram showing a relationship in one embodiment of the invention between the sensors, the tamper detection and zeroing circuitry, and the electronic components to be protected.

FIG. 4 is a block diagram showing the relationship in one embodiment of the present invention between the sensors, the tamper detection and zeroing circuitry, and the electronic components to be protected. Sensor 170 may comprise one or more of the active security features discussed above including, but not limited to conductive ink fuses, temperature sensors, and embedded three-dimensional resistive network sensors. Sensor 170 may be coupled to tamper detection and zeroing circuitry 172, as represented by directed line 171. Tamper detection and zeroing circuitry 172 may, in turn, be coupled to protected electronic components 174, as represented by directed line 173.

Sensor 170 provides signals to tamper detection and zeroing circuitry 172 which reflect the condition of the security features provided in the security module. In one embodiment of the present invention, tamper detection and zeroing circuitry 172 may comprise a programmed processor, logic circuitry or the like. Should a security feature indicate an attempt at tampering, the tamper detection and zeroing circuitry 172 may respond to the signal provided by sensor 170 to zeroize (destroy or erase) sensitive information that may be stored in protected electronic components 174. In a preferred embodiment of the present invention, protected electronic components 174 may comprise static random access memory (SRAM) and FLASH memory.

The combination of the features described above, along with the pseudo-randomness provided by the multiplicity of serial paths that are available and selectively programmable during the assembly process, ensures the safety of the electronic components within security module 100.

An example of a three-dimensional resistive network sensor will now be discussed in more detail in relation to FIG. 3A, FIG. 3B, FIG. 3C, and FIG. 3D. Referring again to FIG. 3A, LGAs, referred to generally by numeral 128, are provided in a pattern along the periphery of substrate 104. A plurality of isolated surface serpentine conductors, referred to generally by numeral 130, electrically connect LGAs 128 to form a multiplicity of surface serial conductor paths along the periphery of substrate 104 and around interconnects 120. The surface serpentine conductors 130, according to one embodiment, may be formed in a pseudo-random pattern. Interconnects 120 are provided along the periphery of substrate 104 for electrical connection to cover 106.

Referring now to FIG. 3C, a cutaway side view of detail F of FIG. 3B is shown. Two metallization layers of serpentine serial conductor paths, generally referred to by numeral 132, are formed integral to the laminate of substrate 104. Substrate 104 may comprise one or more and, preferably, multiple metallization layers. As an example of a typical configuration, substrate 104 may comprise as many as seven to eight metallization layers. Two or more metallization layers may be used for signal interconnects. Similarly, two or more metallization layers may be used as power and ground planes. A preferred embodiment of the present invention uses one or more of these metallization layers to fabricate multiple serpentine serial conductor paths.

Figure 3D:
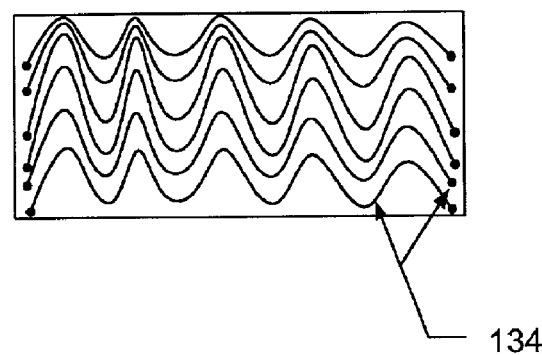
FIG. 3D illustrates multiple isolated serpentine serial conductor paths pseudo-randomly located on a metallization layer of the substrate of FIG. 3A.

These multiple serpentine serial conductor paths may be fabricated on each metallization layer in such a manner that they are essentially in parallel with one another on the metallization layer. FIG. 3D shows a cutaway top view of an example of one such metallization layer. Other embodiments may employ other suitable metallization patterns of serpentine conductors. It can be seen from FIG. 3D that multiple isolated serpentine serial conductor paths, referred to generally by numeral 134, run across substantially the entire metallization layer in a pseudo-random manner.

Referring again to FIG. 3C, plated through-holes or blind vias, referred to generally by numeral 136, form a part of the picket fence configuration discussed above. The plated through-holes or blind vias electrically connect isolated serpentine serial conductor paths on one metallization layer to other isolated serpentine serial conductor paths on one or more different metallization layers. In this manner, one or more and, preferably, multiple continuous serial paths are formed between metallization layers. Thus, the serpentine serial conductor paths are inter-digitated between metallization layers.

Vias 136 also serve to connect the serpentine serial conductor paths on different metallization layers to LGAs 128 on the periphery of the surface of substrate 104. These electrical connections between serpentine serial conductor paths on metallization layers within substrate 104 and LGAs on the surface of substrate 104 allow one or more and, preferably, multiple continuous serial paths to be formed between and around substrate 104 and cover 106, as will be discussed in more detail below in relation to FIG. 5A, FIG. 5B, FIG. 5C, FIG. 5D, and FIG. 5E.

Figure 5E:
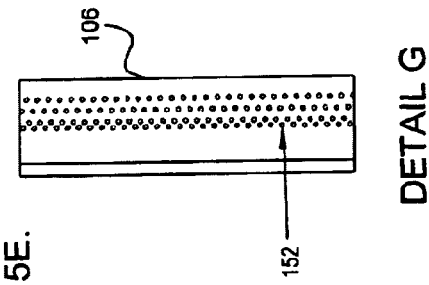
FIG. 5E illustrates a picket fence configuration on the cover of FIG. 5A.
Figure 5A:
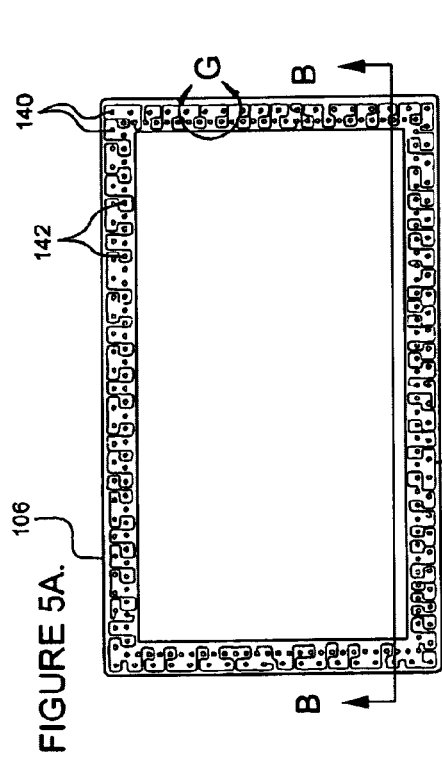
FIG. 5A illustrates a bottom view of a cover for the security module of FIG. 1.

FIG. 5A shows a bottom view of cover 106. LGAs are fabricated in a pattern along the periphery of cover 106 and are referred to generally by numeral 142. Isolated surface serpentine conductors, referred to generally by numeral 144, electrically connect LGAs 142 to form one or more and, preferably a multiplicity of surface serial conductor paths along the periphery of cover 106. In a preferred embodiment of the present invention, surface serpentine conductors 144 may form multiple serial conductor paths. The number of possible paths will be large enough that any one path will appear to be random. Thus, a pseudo-random path of surface serpentine conductors 144 is possible.

The pattern formed by LGAs 142 matches the pattern of LGAs 128 shown in FIG. 3A. Thus, when the surfaces of substrate 104 and cover 106 are abutted, an electrical connection will be established between an LGA on substrate 104 and a respective LGA on cover 106. Interconnects 140 are provided along the periphery of cover 106 for electrical connection to substrate 104. This electrical connection may be established using BGA connections, which will be discussed below in relation to FIG. 5C.

Figure 5B:
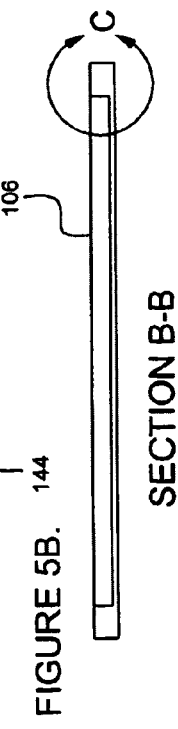
FIG. 5B illustrates a side view of the cover of FIG. 5A.
Figure 5C:
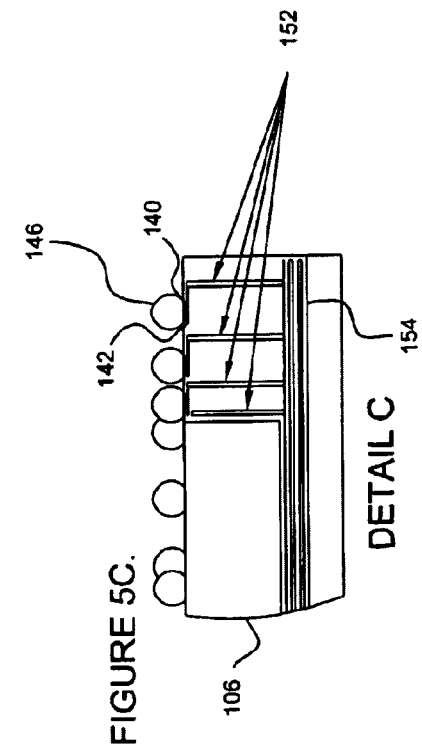
FIG. 5C illustrates a cutaway side view of the cover of FIG. 5A.

FIG. 5C shows detail C of FIG. 5B, which is a side view of cover 106. Metallization layers of serpentine serial conductor paths, generally referred to by numeral 154, are formed integral to the laminate of cover 106. Cover 106 may comprise one or more and, preferably, multiple metallization layers. A preferred embodiment of the present invention uses one or more of these metallization layers to fabricate serpentine serial conductor paths. These multiple serpentine serial conductor paths are fabricated on each metallization layer in such a manner that they are essentially in parallel with one another on the metallization layer, as was discussed above in relation to FIG. 3D.

Figure 5D:
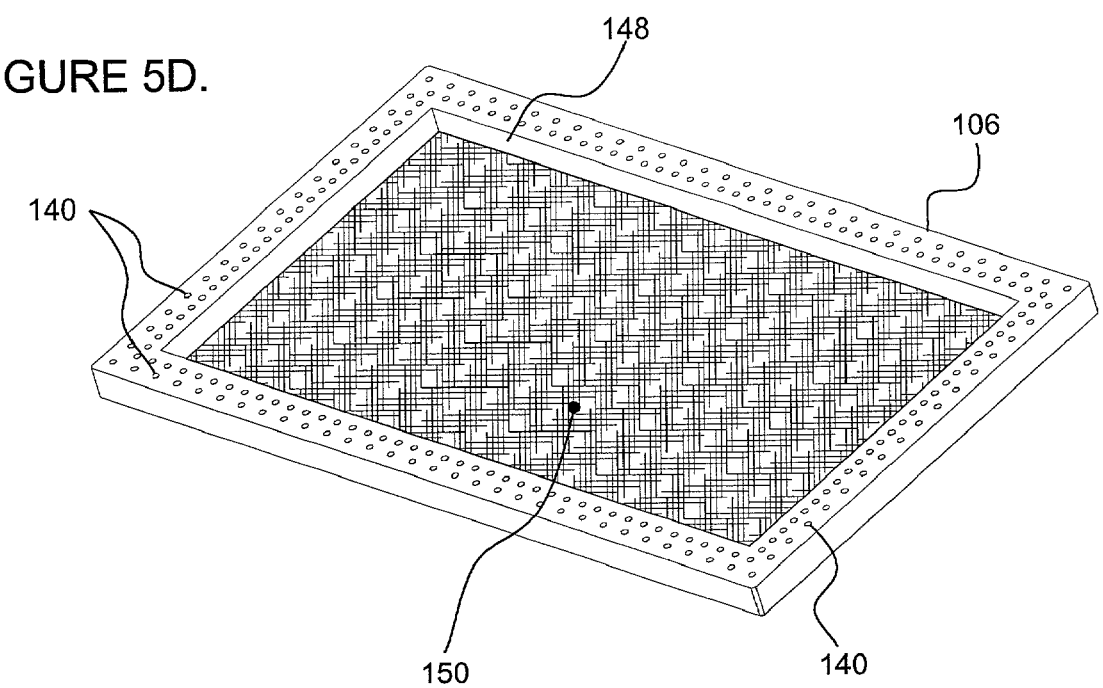
FIG. 5D illustrates a perspective view of the bottom side of the cover of FIG. 5A.

FIG. 5D shows a perspective view of the bottom side of cover 106. Interconnects 140 are again shown along the entire periphery of the bottom surface of cover 106. The recessed portion of cover 106 is surrounded by inner seal ring 148. Pseudo-random serpentine serial conductor paths 150 can be seen in the metallization layer in the top of the recessed portion of cover 106. In addition, the non-recessed portion of cover 106, i.e., the periphery of cover 106, contains multiple metallization layers, the number being dependent on the required depth of the recess. Surface serpentine conductors 144 are not shown in FIG. 5D.

Referring again to FIG. 5C, plated through-holes or blind vias, referred to generally by numeral 152, form a part of the picket fence configuration discussed above and shown in FIG. 5E. The plated through-holes or blind vias electrically connect isolated serpentine serial conductor paths on one metallization layer to other isolated serpentine serial conductor paths on one or more different metallization layers. In this manner, one or more and, preferably, multiple continuous serial paths between metallization layers are formed. Thus, the serpentine serial conductor paths are inter-digitated between metallization layers.

Vias 152 also serve to connect the serpentine serial conductor paths on different metallization layers to LGAs 142 on the periphery of the surface of cover 106. These electrical connections between serpentine serial conductor paths on metallization layers within cover 106 and LGAs on the surface of cover 106 allow a continuous serial path to be formed between and around cover 106 and substrate 104.

In FIG. 5C, solder balls, referred to generally by numeral 146, are shown on top of, and electrically connected to interconnects 140 along the periphery of the surface of cover 106. As discussed above, interconnects 140 are, in turn, electrically connected to vias 152 through LGAs 142, and therefore are also electrically connected to metallization layers 154.

When substrate 104 and cover 106 are abutted during the assembly process, solder balls 146 on cover 106 will align with respective interconnects 120 on substrate 104 due to the matching pattern of LGAs on substrate 104 and cover 106, as discussed above. Thus, a multiplicity of continuous serial paths will be formed between and around the enclosure formed by substrate 104 and cover 106.

An advantage of this configuration of serpentine serial conductor paths provided throughout the enclosure formed by substrate 104 and cover 106 is that it makes it very difficult to penetrate the enclosure without triggering the tamper detection circuit. Further, the serpentine serial conductor paths create a "Faraday cage" around the protected electronic components, providing protection against tampering by pulsed electro-magnetic fields. In addition, this configuration of serpentine serial conductor paths may be cost-effectively integrated into the manufacturing process of the multi-layer substrate and cover.

The isolated surface serpentine conductors located along the periphery of substrate 104 and cover 106 provide added protection against penetration of security module 100 along the abutted surfaces of substrate 104 and cover 106, because an attempt to penetrate this area may result in a short circuit between serial paths which may be detected by the tamper detection circuit.

Protection against side penetration of security module 100 is provided by the picket fence configuration of plated through-holes and blind vias which is provided along the periphery of both substrate 104 and cover 106, including around the corners. This picket fence configuration provides very little spacing between plated through-holes and blind vias to reduce any free space at which to penetrate the sides of security module 100.

Further protection against side penetration of security module 100 is provided by the BGA interconnects which provide a strong mechanical connection between the abutted surfaces of the substrate and cover. Another advantage of the BGA interconnect method of manufacturing security module 100 is that it may be fully automated. Thus, security module 100 may be cost-effectively mass produced.

The combination of the security features described above, along with the pseudo-randomness provided by the multiplicity of serial paths available and programmable during the assembly process, ensures the safety of the electronic components within security module 100.

Referring again to FIG. 3A, programmable pad array 138 is shown on substrate 104. Each of the pads of programmable pad array 138 may be connected to various serial conductive paths formed around the enclosure. The pads of programmable pad array 138 may be selectively wirebonded to each other, i.e. programmed, during the assembly process to combine these various serial paths together in a pseudo-random manner to form a multiplicity of continuous serial paths around the enclosure formed by substrate 104 and cover 106. Thus, embodiments of the present invention may be configured to provide both pseudo-random patterns of horizontal and vertical serial paths and pseudo-random interconnection of those serial paths, which results in additional protection against access to the enclosed electronic components.

Figure 6C:
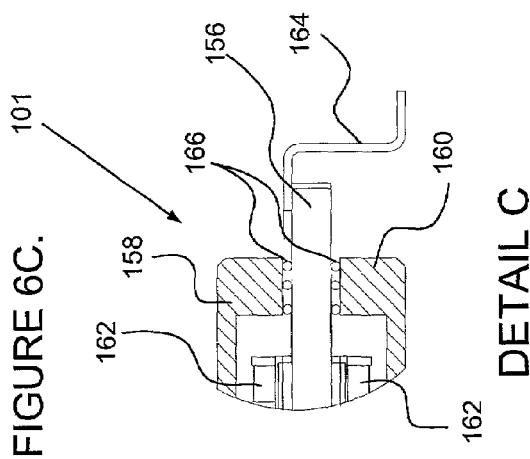
FIG. 6C illustrates ball grid array interconnects on the peripheries of both sides of a substrate for the double-sided security module of FIG. 6A.
Figure 6A:
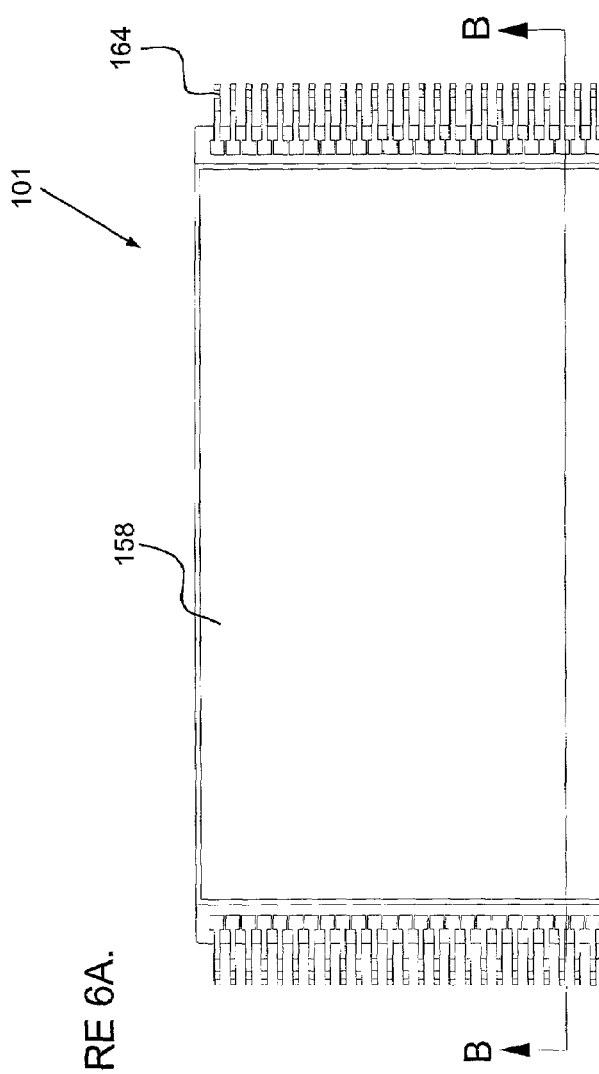
FIG. 6A illustrates a top view of a double-sided security module as a discrete component according to an embodiment of the invention.

FIG. 6A shows a top view of an alternative embodiment of the present invention. Double-sided security module 101 includes top cover 158, as seen in the top view of FIG. 6A, and bottom cover 160 (not shown in FIG. 6A), along with leads 164. As with security module 100, double-sided security module 101 may be manufactured as a discrete component which may then be attached to a PCI card using, for example, SMT. In the alternative, double-sided security module 101 may be manufactured as a subassembly mounted in a standard carrier technology such as a card in PCMCIA format. FIG. 6A illustrates an embodiment of double-sided security module 101 as a discrete component. Thus, leads 164 have been attached to substrate 156 (not shown in FIG. 6A) during the assembly process to provide means for surface mounting.

Figure 6B:
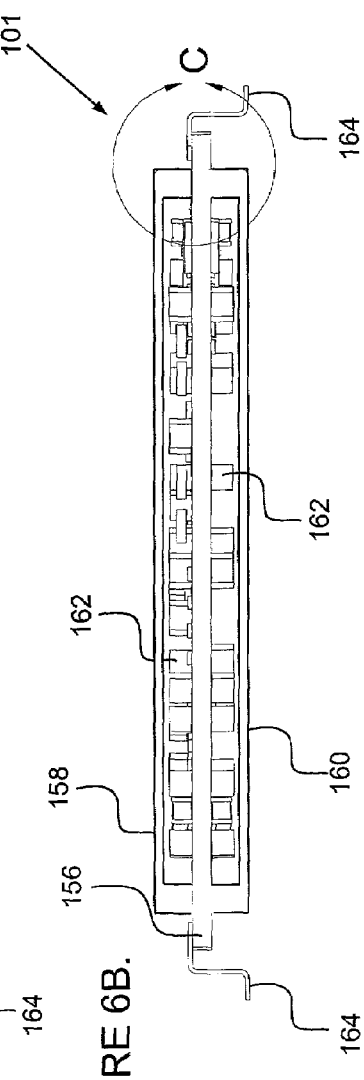
FIG. 6B illustrates a cutaway view of one end of the double-sided security module of FIG. 6A.

FIG. 6B shows a cutaway view of one end of double-sided security module 101. Substrate 156 is sandwiched between two covers, top cover 158 and bottom cover 160. Substrate 156 is manufactured using multi-layer laminate technology. Electronic components 162 are attached to both sides of substrate 156. Interconnects (not shown in FIG. 6B) are provided on the periphery of both sides of substrate 156 to allow attachment of both top cover 158 and bottom cover 160.

In the present example, top cover 158 and bottom cover 160 are manufactured in the same manner as cover 106, as described above in relation to security module 100, and each includes a co-laminated backplane (not shown in FIG. 6B), made of an opaque material such as, but not limited to, copper, titanium, aluminum tantalum, solder tinned on patterns of copper traces which effectively obscure the patterns of conductors formed in the substrate, or the like, which provides a deterrent against X-rays and other electro-magnetic inspection tools. Top cover 158 and bottom cover 160 are mechanically identical. In addition, in the present example, top cover 158 and bottom cover 160 each include all the features of cover 106 discussed above in relation to security module 100. These include multiple layers of inter-digitated serpentine serial conductor paths, LGAs, surface serpentine conductors, and picket fences.

Substrate 156 may include the protective coatings discussed above in relation to substrate 104 of security module 100, which in the present embodiment may be provided on both sides of substrate 156. Substrate 156 also may include conductive ink fuses, a temperature sensor, a programmable pad array, a tamper detection circuit, and the interconnects between the inter-digitated serpentine serial conductor paths, LGAs, surface serpentine conductors, and picket fences on top cover 158 and bottom cover 160. However, because top cover 158 and bottom cover 160 now form the enclosure that surrounds electronic components 162 on substrate 156, penetration of either may trigger the tamper detection circuit provided on substrate 156. Thus, substrate 156 itself no longer requires layers of inter-digitated serpentine serial conductor paths.

Top cover 158 and bottom cover 160 may be abutted to their respective sides of substrate 156 using suitable interconnecting structure. In a preferred embodiment, BGA interconnects are used in the same manner as discussed above in relation to security module 100. FIG. 6C illustrates this by showing BGA interconnects 166 prior to a wave flow process.

An example manufacturing and assembly process of a preferred embodiment of the present invention will now be discussed in more detail. The metallization layers of the substrate and cover may be cost-effectively fabricated using standard deposition techniques. These techniques are conducive to automated production processes. In a preferred embodiment of the present invention, a 0.0007 inch thick copper metallization layer with 0.003 inch lines and spaces may be used. The diameter of non-plated vias forming the picket fence configuration may be 0.008 inch with approximately a 0.020 inch via to via pitch. In other embodiments, other materials and dimensions for the metallization layers and vias may be used.

One method for fabricating the surface serpentine conductors is by application of a thin solder mask, which would be easily destroyed in any penetration attempt, creating a short-circuit, as discussed above. Other suitable methods for fabricating the surface serpentine conductors are also possible.

The BGA interconnects may be formed by printing a eutectic alloy, such as, but not limited to, Pb37/Sn63 over the LGA pattern on the cover and reflowing to form the solder balls. Other alloys and processes may also be used. One method of electrical and mechanical connection between the cover and the substrate is to place the cover and the substrate in contact such that the solder balls align with the LGAs on the substrate and reflowing the assembly. This method of connection is conducive to cost-effective automated processes. Other suitable methods may also be used.

The high temperatures required for attachment of the cover to the substrate may prove detrimental to standard epoxy glass laminate material. Therefore, other laminates, such as, but not limited to, higher Tg laminates based on FR-5, BT, or polyimide materials, may be used for substrate and cover fabrication. By choosing appropriate values for the pad diameters of the LGAs and the amount of solder printed to form the substrate-cover connections, edge separation between the substrate and the cover may be reduced, for example, to approximately 0.002 inch.

As an example, electronic component assembly may be performed using chip-on-board (COB) technology for wirebondable die, or a combination of COB and SMT for passive components. The integrated circuits (ICs) may be attached to the substrate using conductive epoxy, and wirebonded with aluminum wire. The top surface finish required for the aluminum wirebonding is compatible with the use of Pb/Sn eutectic alloy. The use of gold wirebonding requires a thicker gold finish to the bond pads, which potentially creates reliability issues for the solder joints formed on the same surface. In addition, the use of aluminum wirebonds contribute to tamper protection because they do not produce X-ray contrast. The leads used to surface mount the security module in an SMT implementation of the present invention may be solder attached to the substrate. Copper leads may be used to match the coefficient of thermal expansion of the substrate. Lead attachment may be performed using high Pb content solder with a melting point higher than the reflow temperature of the eutectic Pb/Sn (210 degrees C.–220 degrees C.). Other suitable methods and materials may also be used.

As discussed above, a programmable pad array may be included on the substrate to program pseudo-random combinations of serial conductor paths around the enclosed area. During the assembly process, selective wirebonding of the programmable pad array may be performed using, as an example, X-ray transparent aluminum wire. Thus, the programming of pseudo-random combinations of serial conductor paths around the enclosed area may be cost-effectively programmed into the automatic wirebonding routines.

The security coating used to cover the electronic components may be a hard spray coating, such as, but not limited to, a hard, conforming, electrically insulating material, such as an epoxy and, more preferably, an opaque epoxy. However, other suitable commercially available electrical component coating materials may be employed. As an example, the security coating could form a shell with an approximate thickness of 0.020 inches over the substrate and electronic components. Another suitable thickness is also possible. The security coating could not then be removed from the substrate without causing substantial damage to the electronic components. The environmental barrier coating may be any type of a silicone block-copolymer and/or other similar material compatible with electronic components.

In the alternative, a diamond-like coating (DLC) could be used in place of the security coating. DLC may be deposited over the electronic components using a low temperature plasma-assisted chemical vapor deposition (PACVD) process. DLC is a very hard, insulating, highly chemically inert compound with excellent adhesion to the silicon, metal, and dielectric surfaces, which may be further improved by using un-doped poly-silicon (PACVD grown) as the adhesion promoter. Using DLC, a shell with an approximate thickness of 0.010 to 0.015 inches could be formed over the electronic components. Another suitable thickness is also possible An advantage to the use of DLC is that it may reduce or eliminate the need for an environmental barrier coating due to the superior environmental barrier properties of the DLC itself. This could represent recurrent cost savings. Also, incorporation of the PACVD step into the assembly process flow may be relatively easily accomplished, as high-throughput PACVD equipment is commonly used in semiconductor manufacturing.

The air gap between the coatings and the cover may be filled or glued to prevent removal. However, if the wave soldering operation involving the aligning and seating of the cover BGA interconnects with the substrate LGAs is used, interference caused by the gap filler may hinder the aligning and seating process.

A final encapsulation of the enclosed area may be accomplished by underfilling the area between the cover and the substrate. This step may be eliminated completely by using no-flow encapsulants which act as both the flux and the underfill during the solder reflow.

To provide additional physical bonding between the substrate and the cover, a "no flow flux" (NFF) agent having an adhesive component and a flux component may be used. Preferably, when the module is subjected to high temperature process to flow the solder connections together, the adhesive component remains at the interface of the substrate and the cover, to bond the cover to the substrate. In one example, NFF may be composed of an epoxy-based carrier and a flux compound. NFF may be applied to the substrate and cover prior to the wave flow operation discussed above. As the device is heated up during the wave flow process, the flux compound will dissipate and only the epoxy carrier will remain. The heat of the wave flow allows the epoxy to flow minimally, creating a fillet. When the assembly has cooled, the epoxy carrier will have hardened, creating a strong bond between the substrate and cover.

The architecture of the security module, and the general assembly techniques described above, may further enhance the security provided to the electronic components. The advanced laminate technology of the substrate and cover allows variance in the shape of the cavity and the BGA area without fundamental changes to the fabrication and assembly processes. Further, additional penetration and temperature sensors may be introduced into the cavity and interconnected using the top metallization layer of the cover without significant changes to the security module outline.

Various embodiments of the present invention discussed above may include one or more of the security features described above. One preferred embodiment of the present invention contains all of the security features.

Therefore, embodiments of the present invention provide apparatuses and processes for securing electronic components. A security module apparatus provides protection for electronic components contained within the enclosure created by the abutting of a substrate and a cover. Sensors and components provided on the substrate, along with a three-dimensional resistive network sensor embedded in the substrate and cover, provide signals to tamper detection circuit provided on the substrate in the event of a tampering attempt. Key zeroing electronics provided on the substrate will, in response to a signal, destroy or erase any sensitive programs or data contained in protected electronic components. The security module may be cost-effectively fabricated and assembled by automated processes.

Embodiments of the present invention also provide a process for programming pseudo-random combinations of serial conductor paths around the protected electronic components. These pseudo-random combinations of serial conductor paths around the protected electronic components may be cost-effectively programmed into automatic wirebonding routines.

Thus, embodiments of the present invention provide a cost-effective automated process for fabricating and assembling a security module apparatus that provides a high level of protection for electronic components.

What is claimed is:

1. A security module for protecting circuit components from unauthorized access, the module comprising:
   a substrate composed of a plurality of layers including a first layer, the first layer of the substrate for supporting circuit components to be protected;
   a cover member having side portions and a lid portion, the side portions defining a surface for abutting the first layer of the substrate, and the lid portion being disposed over and spaced from the first layer of the substrate when the circuit components are supported on the substrate and the cover member is abutted to the substrate, the cover member composed of a plurality of layers; and a sensor comprising at least one conduction path disposed in at least one of the layers below the first layer of the substrate, at least one conduction path disposed in at least one of the layers of the cover member, and a plurality of vias disposed in the side portions of the cover member, each via comprising an electrically conductive material connecting at least one conduction path in the layers of the cover member to the surface of the cover member.

2. The security module as recited in claim 1, further comprising an electronic circuit disposed on the substrate for detecting at least one of a short or a break in the conduction path disposed in the substrate or in the cover member.

3. The security module as recited in claim 1, wherein the conduction path in the substrate and the cover member comprise at least one serpentine path.

4. The security module as recited in claim 1, wherein the conduction path in the substrate and the cover member comprises a plurality of serpentine paths.

5. The security module as recited in claim 1, wherein the substrate and the cover member comprise a plurality of layers, each layer having at least one conduction path.

6. The security module as recited in claim 5, wherein each layer of the substrate and the cover member comprises a plurality of serpentine paths.

7. The security module as recited in claim 6, wherein the plurality of serpentine paths are disposed on the substrate and the cover member in a pseudo-random configuration.

8. The security module as recited in claim 1, each conduction path comprising a thin-film conductor formed directly on the associated layer.

9. A security module as recited in claim 1, the sensor further comprising:

a plurality of vias disposed along a periphery of the substrate, each via comprising an electrically conductive material connecting at least one conduction path in the layers of the substrate to the first layer of the substrate.

10. The security module recited in claim 9, wherein the plurality of vias are disposed along the periphery of the substrate in a staggered pattern.

11. A security module for protecting circuit components from unauthorized access, the module comprising:

a substrate for supporting circuit components to be protected, the substrate having a first surface;

a cover member including side portions defining a second surface for abutting the first surface of the substrate, the cover member defining an enclosure space for enclosing circuit components to be protected between the cover member and the substrate and surrounded by the side portions of the cover member, when the circuit components are supported by the substrate and the second surface of the cover member is abutted to the first surface of the substrate; and a sensor comprising a plurality of vias in the side portions of the cover member, each via comprising an electrically conductive material defining a plurality of conduction paths extending transverse to the first and second surfaces, surrounding the enclosure space, when the second surface of the cover member is abutted to the first surface of the substrate.

12. The security module recited in claim 11, wherein the plurality of vias in the side portions of the cover member are disposed in a staggered pattern.

13. A security module for protecting circuit components from unauthorized access, the module comprising:

a substrate for supporting circuit components to be protected, the substrate having a first surface;

a cover member including side portions defining a second surface for abutting the first surface of the substrate, the cover member defining an enclosure space for enclosing circuit components to be protected between the cover member and the substrate and surrounded by the side portions of the cover member, when the circuit components are supported by the substrate and the second surface of the cover member is abutted to the first surface of the substrate; and a sensor comprising a plurality of solder balls electrically connected to the second surface of the cover member, the plurality of solder balls electrically and mechanically connecting to the first surface of the substrate when the second surface of the cover member is abutted to the first surface of the substrate.

14. The security module in claim 13, the sensor further comprising:

a plurality of surface interconnects disposed on the abutting surfaces of both the substrate and the cover member, at least one of the plurality of surface interconnects on both the substrate and the cover member being electrically connected to at least one of the plurality of solder balls, the plurality of surface interconnects on the substrate and the cover member having matching patterns that electrically interconnect when the second surface of the cover member is abutted to the first surface of the substrate.

15. The security module recited in claim 14, the sensor further comprising a plurality of surface serial conductors on the abutting surfaces of both the substrate and the cover member, at least one of the plurality of surface serial conductors on both the substrate and the cover member electrically interconnecting the plurality of surface interconnects on the respective abutting surfaces of the substrate and cover member.

16. The security module recited in claim 14, wherein:

the substrate and the cover member each comprise one or more and, preferably, a plurality of layers, at least one of the plurality of layers on both the substrate and the cover member having at least one conduction path disposed thereon, the at least one conduction path being electrically connected to at least one of the plurality of solder balls.

17. A method for manufacturing a security module, the method comprising the steps of:

providing a substrate, the substrate composed of a plurality of layers including a first layer, the first layer of the substrate for supporting circuit components to be protected;

providing a cover member, the cover member composed of a plurality of layers, the cover member having a surface for abutting the first layer of the substrate, the cover member defining an enclosure space for enclosing circuit components to be protected between the cover member and the substrate, when the circuit components are supported on the substrate and the cover member is abutted to the substrate;

providing a sensor comprising at least one conduction path disposed in at least one of the layers below the first layer of the substrate and at least one conduction path disposed in at least one of the layers of the cover member.

18. The method recited in claim 17, wherein the step of providing a sensor comprising at least one conduction path disposed in at least one of the layers below the first layer of the substrate and at least one conduction path disposed in at least one of the layers of the cover member comprises forming a thin-film conductor directly on the associated layer.

19. The method recited in claim 18, wherein the step of forming a thin-film conductor directly on the associated layer further comprises forming a plurality of thin-film conductors on the associated layer.

20. The method recited in claim 19, wherein the plurality of thin-film conductors are formed on the associated layer in a pseudo-random configuration.

21. The method recited in claim 17, further comprising the step of:
providing a plurality of vias in the side portions of the cover member, each via comprising an electrically conductive material connecting at least one conduction path in the layers of the cover member to the surface of the cover member.

22. The method recited in claim 21, wherein the plurality of vias in the side portions of the cover member are formed in a staggered configuration.

23. The method recited in claim 21, further comprising the step of:
providing a plurality of vias along a periphery of the substrate, each via comprising an electrically conductive material connecting at least one conduction path in the layers of the substrate to the first layer of the substrate.

24. The method recited in claim 23, wherein the plurality of vias along the periphery of the substrate are formed in a staggered configuration.

25. The method recited in claim 23, further comprising the step of:
providing a plurality of surface interconnects disposed on the abutting surfaces of both the substrate and the cover member, the plurality of surface interconnects on the substrate and the cover member having matching patterns that electrically interconnect when the cover member is abutted to the substrate, and wherein at least one of the plurality of surface interconnects is electrically connected to at least one of the plurality of vias in the cover member and the substrate.

26. The method recited in claim 25, further comprising the step of:
providing a plurality of surface serial conductors on the abutting surfaces of both the substrate and the cover member, at least one of the plurality of surface serial conductors on both the substrate and the cover member electrically interconnecting the plurality of surface interconnects on the respective abutting surfaces of the substrate and cover member.

27. The method recited in claim 26, wherein the step of providing a plurality of surface serial conductors on the abutting surfaces of both the substrate and the cover member comprises utilizing a thin solder mask to form the surface serial conductors.

28. The method recited in claim 26, further comprising the step of:
providing a plurality of solder balls, at least one of the plurality of solder balls being electrically connected to at least one of the plurality of surface interconnects on the cover member.

29. The method recited in claim 28, wherein the step of providing a plurality of solder balls comprises printing a eutectic alloy over a pattern of the surface interconnects on the cover member and reflowing to form the solder balls.

30. The method recited in claim 28, further comprising the step of:
abutting the surfaces of the substrate and the cover member together.

31. The method recited in claim 30, wherein the abutting step comprises aligning the
plurality of solder balls on the cover member with the plurality of surface interconnects on the substrate and reflowing the assembly.

32. The method recited in claim 28, further comprising the step of:
providing a pseudo-randomly configured three-dimensional resistive network by electrically interconnecting at least one conduction path, at least one via, at least one surface interconnect, at least one surface serial conductor, and at least one solder ball.

33. The method recited in claim 32, wherein the step of electrically interconnecting at least one conduction path, at least one via, at least one surface interconnect, at least one surface serial conductor, and at least one solder ball comprises wirebonding a programmable pad array.

* * * * *